Figure 1:
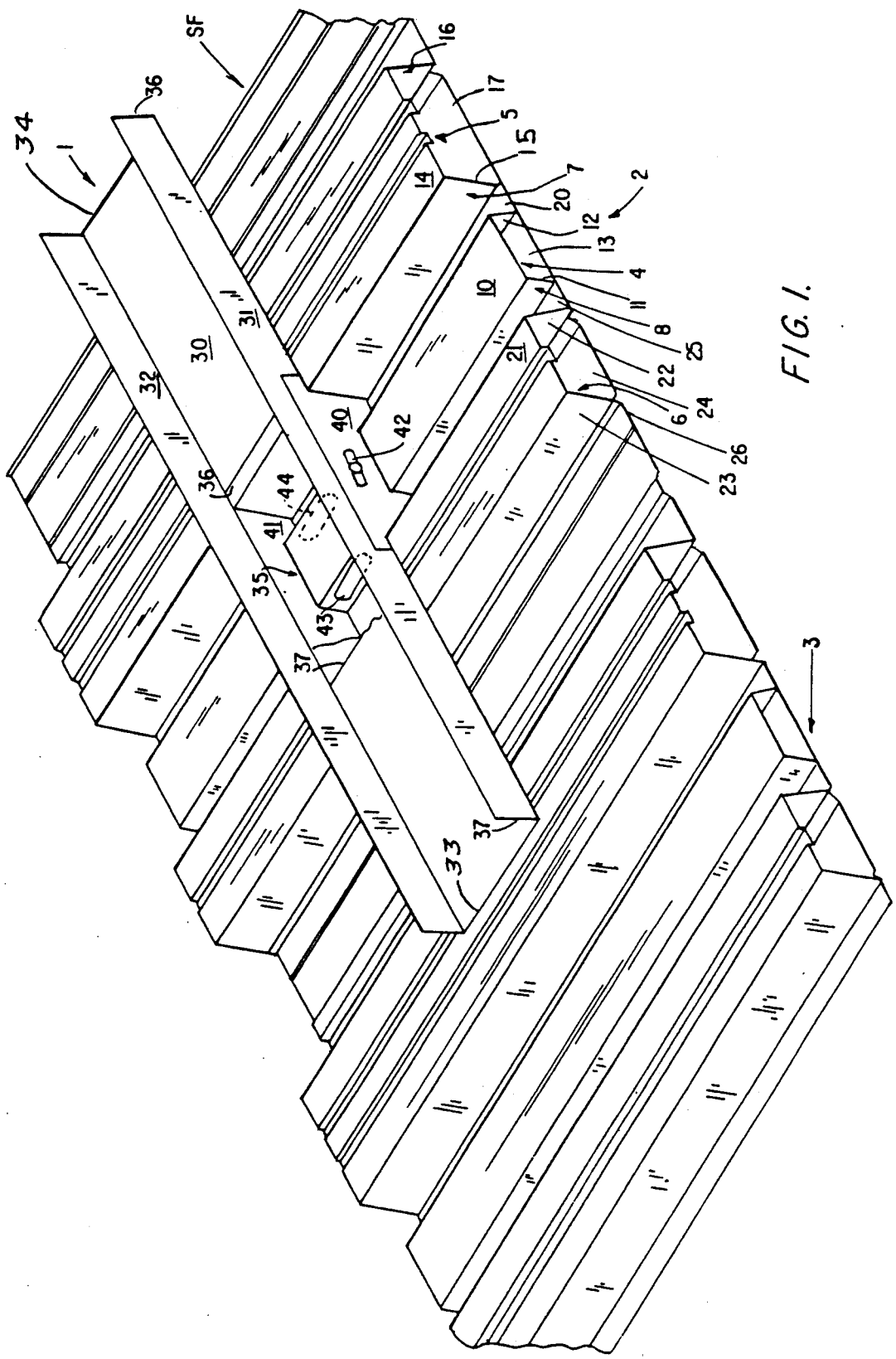

United States Patent [19]

Harmon

[11] Patent Number: 5,039,827
[45] Date of Patent: Aug. 13, 1991

[54] POWER CELL FEED

[75] Inventor: J. David Harmon, Vienna, W. Va.

[73] Assignee: Butler Manufacturing Company, Kansas City, Mo.

[21] Appl. No.: 439,600

[22] Filed: Nov. 13, 1989

[51] Int. Cl.$^5$ .............................................. H02G 3/04
[52] U.S. Cl. ................................................... 174/48
[58] Field of Search ...................... 174/48, 49; 52/221

[56] References Cited

U.S. PATENT DOCUMENTS

| 3,721,051 | 3/1973 | Fork | 174/49 X |
| 3,903,666 | 9/1975 | Fork | 174/49 X |
| 4,010,314 | 3/1977 | Kohaut | 174/48 |
| 4,065,896 | 1/1978 | Penczak | 174/48 X |
| 4,728,750 | 3/1988 | Teslovich | 174/48 |

Primary Examiner—Leo P. Picard
Assistant Examiner—David A. Tone
Attorney, Agent, or Firm—Frederick J. Olsson

[57] ABSTRACT

An elongated power compartment to be disposed inside of a trenchduct. The compartment having a bottom wall and two side walls. Centrally of the compartment, an opening is formed in the bottom. On each side wall and centrally of the compartment there is a downwardly extending barrier. The bottom opening is to provide access to a power cell in a underfloor raceway and the barriers function to prevent the passing of power cable out of the space beneath the compartment into the low tension side of the trenchduct. The bottom opening is in communication with the raceway valleys.

4 Claims, 1 Drawing Sheet

POWER CELL FEED

This invention relates to underfloor or infloor electrical distribution systems for buildings and the like wherein the system includes cellular raceway fed from bottomless trenchduct.

More specifically, the invention relates to structure to provide improved electrical cable passageway means between the power compartment of the trenchduct and the power cell of a cellular raceway.

One of the objects of the invention is to provide an improved passageway means of the kind in question which functions to reduce the forces necessary to pull power cable through the power compartment and the power cell.

Another object of the invention is to provide improved passageway means of the kind in question which functions to reduce the destructive forces generated during pulling and acting on the cable insulation.

Another object of the invention is to provide improved passageway means of the kind in question which provides for an increase in the capacity or number of cables normally carried by a power cell of conventional cross section.

Another object of the invention is to provide improved passageway means of the kind in question wherein only a single 90° bend of the power cable at the entry point is required for the cable to extend into and along the power cell.

Another object of the invention is to provide improved passageway means of the kind in question arranged for the power cable to have only a single, enlarged-radius bend at the power cell entry point.

Another object of the invention is to provide a chamber around the access hole where the cable enters the power cell which provides hand room for connecting cable and for storing the connector means below the bottom of the power compartment.

A still further object of the invention is to provide for a larger area to place and hold any necessary splicing of power cable conductors. The additional area makes the trenchduct more user-friendly.

Before describing the invention, I want to mention U.S. Pat. No. 3,903,666 which provides for compartment-to-cell feed in a bottomless trenchduct. Also it will be understood that the terms "trench" and "trenchduct" are synonymous.

The invention will be explained below in connection with FIG. 1 which is a perspective view of a metal subfloor including a cellular raceway whose power cell is fed from a power compartment mounted on the subfloor, the arrangement incorporating the invention.

In FIG. 1, I have not illustrated the layer of concrete over the subfloor SF nor the side rails and covers of the bottomless trenchduct. The partial power compartment of the trenchduct (disposed intermediate the side rails) is indicated at 1 and will be described in detail later. The power compartment carries high tension cable and the areas on opposite sides of the compartment between the respective side rails carry low tension cable. As is understood, the function of the trenchduct is to feed low and high tension conductors to the cells of cellular raceway in the subfloor wherein the same are to run to various work stations on the floor surface.

The subfloor illustrated is a section of a full cellular subfloor, that is to say, is comprised solely of blended cellular raceway. The drawing shows two of such raceways, one being indicated at 2 and the other at 3. It will be understood, of course, that the invention is applicable to floors which are partially cellular; i.e. comprised of cellular raceways connected together by corrugated decking. Except as modified to incorporate the invention as will be noted later, the cellular raceways are of conventional design.

Before proceeding, it is pointed out that FIG. 1 is a line drawing wherein the components are illustrated without a finite thickness. This was done simply for purposes of clarity. Cellular raceway of the kind being considered normally have a thickness between 16 gauge and 28 gauge and the power compartment having a thickness between 14 and 20 gauge.

The cellular raceway 2 has a central high tension or power cell 4 and a pair of outboard low tension or communication cells 5 and 6 which are spaced from the cell 4 by the valleys 7 and 8. Each cell is formed by a top flange or crest, depending webs, and a base.

Thus, the power cell 4 has crest 10, webs 11 and 12 connected to the edges of the crest and extending downwardly therefrom, together with a bottom 13 connected between the lower edges of the webs 11 and 12. The structure forms an enclosed cell.

The low tension cell 5 has a crest 14, webs 15 and 16 connected to the edges of the crest and extending downwardly therefrom together with a bottom 17 connected to the lower edges of the webs 15 and 16.

A base 20 is connected to the bottoms 13 and 17 and the webs 12 and 15.

The low tension cell 6 has a crest 21, webs 22 and 23 connected to the edges of the crest and extending downwardly therefrom, together with a bottom 24 connected to the lower edge of the webs 22 and 23.

A base 25 is connected to the bottoms 13 and 24 and to webs 11 and 22.

It will be evident that the valley 7 is formed by the webs 12 and 15 and by the base 20. The valley 8 is formed by the webs 11 and 22 and by the base 25.

The raceway 3 has the same structure as above described. The two raceways are blended in the area 26.

As will be evident, the crests 14 and 21 are coplanar and the crest 10 is spaced downwardly from the crests 14 and 21.

The power compartment 1 has a bottom wall 30 and upright side walls 31 and 32. Conventionally the side walls 31 and 32 each slidingly support an upper section which is adjusted to engage the underside of the trench covers and be locked in position and thus partition off the high and low tension sections of the trench. For present purposes it is unnecessary to show the upper sections.

As indicated the power compartment 1 is disposed over the cellular raceway and the bottom 30 engages the crests 14 and 21. The bottom 30 is spaced from the power cell crest 10. The compartment is fixed to crests 14 and 21 by conventional means such as fasteners or bead welds.

The opposite ends 33 and 34 of the power compartment 3 extend outwardly of the cellular raceway 1. The ends 33 and 34 are abutted with and fixed to other power compartments not shown.

With the above in mind, I will now describe the structure providing the improved passageway means between the power compartment 1 and the power cell 4.

The bottom 30 of the power compartment has an enlarged opening 35 which extends between the walls 31 and 32 and terminates at the edges 36 and 37 respectively on the crests 14 and 21. The opening exposes the cell 4, the valleys 7 and 8, and the webs 15 & 22.

The side walls 31 and 32 have extensions or barriers 40 and 41 which extend down and engage the cellular raceway 2; i.e. crests 10 - 14 - 21, webs 22 - 11 - 12 - 15, and bottoms 25 - 20. The barriers are secured to the side walls by conventional means, for example, a slot/pop rivet arrangement noted at 42. The extension or barriers, like the walls 31 and 32 maintain power cable inside the space beneath the compartment. The low tension cable does not extend down into the valleys 7 and 8.

It will be evident that the structures described constitute a chamber extending from web 15 over the power cell 4 to the web 22. The chamber is accessed by opening 35.

The webs 11 and 12 of the power cell 4 are provided with elongated access openings 43 and 44 which are in communication with the valleys 7 and 8. The opening 35 is in direct communication with the access openings 43 and 44 and so there is a direct, unobstructed passageway between the interior of the power compartment 1 and the power cell access openings 43 and 44.

The width of each access opening 43 and 44 is shown to be a little less than half of the width of the bottom 30 of the power compartment. The width can be made greater to accommodate more or larger cable.

In conventional feed from a power compartment to a power cell, the cable is bent at 90° to enter the power cell and then bent another 90° to go down the power cell. In contrast to the foregoing, it will be evident that with the present invention the cable from the power compartment to enter the cell and to extend along the cell needs only a single 90° bend at the entry point. Moreover, it will be seen that the radius of the single 90° bend can be increased over the radius of the bend in the conventional feed.

With the above structure the pulling forces to fish the cable is substantially reduced as compared to conventional pulling forces. Thus, the compression forces on the cable insulation (and the destructive rubbing force caused thereon) are reduced.

The enlarged opening 35, the single bend at the entry point, and the size of the access holes cooperate so that for any given pulling force the number of cables which can be pulled through is increased.

In some instances, it is necessary either at initial installation of cable or for subsequent addition or change, to splice cable in the power compartment. The above described chamber and its access opening 35 provide not only plenty of hand room for splice work, but in addition, provide that the splice connection can be stored down in a valley below the bottom of the power compartment. This offers no interference to pass-through cable in the compartment.

I have shown both webs of the power cell 4 as provided with access openings (43 and 44). In those instances where it may be desirable, a single access opening (43 or 44) can be provided.

The invention has been described in connection with a cellular raceway where the crest of the central power is below the crests of the outboard communication cells. The invention is applicable to a cellular raceway where the crests of the three cells are coplanar.

I claim:

1. In the combination of a cellular raceway having a central power cell and oppositely disposed communication cells each separated from the power cell by a valley and a power compartment mounted on the raceway to feed the power cell of the cellular raceway, improved means establishing passageway means for power cable between the interior of the power cell and the interior of the power compartment:
   said power compartment having a bottom wall engaging at least said communication cells and having a pair of side walls connected to and extending upwardly from the bottom wall;
   an access opening formed in at least one web of said power cell and open to the valley adjacent the power cell;
   bottom opening means formed in said bottom of the power compartment extending over and open to the last said valley; and
   on each said side wall, barrier means closely adjacent said cellular raceway to prevent passage of power cable out of said passageway means.

2. In the combination of a cellular raceway having a central power cell and oppositely disposed communication cells each separated from the power cell by a valley and a power compartment mounted on the raceway to feed the power cell of the cellular raceway, improved means establishing passageway means for power cable between the interior of the power cell and the interior of the power compartment:
   said power compartment having a bottom wall engaging at least said communication cells and having a pair of side walls connected to and extending upwardly from the bottom wall;
   an access opening formed in each web of said power cell so as to be open respectively to said valleys;
   bottom opening means formed in said bottom of the power compartment extending over and open to said valleys; and
   on each side all, barrier means closely adjacent said cellular raceway to prevent passage of power cable out of said passageway means.

3. In combination, an elongated horizontally extending cellular raceway and an elongated power compartment disposed over and extending transversely to the cellular raceway:
   the cellular raceway being formed by a central power cell and a pair of communication cells on opposite sides of and spaced from the power cell;
   each said cell having a crest, a pair of webs respectively connected to the opposite edge of the crest and extending downwardly therefrom and a bottom connecting the respective lower edges of the webs;
   between each pair of adjacent cells, a base connected to the lower edges of the adjacent webs;
   each pair of adjacent webs and the base connecting the webs forming a valley;
   in at least one valley the web of the power cell being formed with an access opening providing communication between the interior of the power cell and the valley;
   said power compartment having side walls and a bottom wall connected between the side walls, the bottom wall being mounted, on the crests of said communication cells and having a bottom opening providing communication between the power compartment, last said valley, and said web access opening;
   and said access opening, said one valley, and said bottom opening providing a passageway means between the interior of the power cell and the interior of the power compartment; on each side wall, barrier means engaging said cellular raceway to prevent passage of power cable out of said passageway means.

4. In combination, an elongated horizontally extending cellular raceway and an elongated power compartment disposed over and extending transversely to the cellular raceway:

the cellular raceway being formed by a central power cell and a pair of communication cells on opposite sides of and spaced from the power cell;

each said cell having a crest, a pair of webs respectively connected to opposite edges of the crest and extending downwardly therefrom and a bottom connecting the respective lower edges of the webs;

between each pair of adjacent cells a base connected to the lower edges of the adjacent webs;

each pair of adjacent webs and the base connecting the webs forming a valley;

in each said valley, the respective webs of the power cell each being formed with an access opening providing communication between the interior of the power cell and the valley;

said power compartment having a pair of spaced apart, upright side walls and a bottom wall connected between the side walls, the bottom wall being mounted on the crests of said communication cells and having a bottom opening providing communication between the power compartment and said valleys;

said access openings, said valleys, and said bottom opening providing passageway means between the interior of the power cell and the interior of the power compartment; and on each side wall, barrier means engaging said cellular raceway to prevent passage of power cable out of said passageway means.

* * * * *